J. M. E. FRANC.
TIRE PUMP FOR AUTOMOBILES.
APPLICATION FILED FEB. 16, 1918.

1,310,332.

Patented July 15, 1919.

Witnesses
Jean Germain
Gaston Geay

Inventor
Joseph Marie Etienne Franc

UNITED STATES PATENT OFFICE.

JOSEPH MARIE ETIENNE FRANC, OF ST. VALLIER, FRANCE.

TIRE-PUMP FOR AUTOMOBILES.

1,310,332.   Specification of Letters Patent.   Patented July 15, 1919.

Application filed February 16, 1918. Serial No. 217,640.

*To all whom it may concern:*

Be it known that I, JOSEPH MARIE ETIENNE FRANC, a citizen of the French Republic, residing at St. Vallier, Drome, in France, have invented certain new and useful Improvements in Tire-Pumps for Automobiles, of which the following is a specification.

This invention relates to improvements in tire pumps for automobiles.

The improved pump is principally characterized by means whereby it can be very quickly and at the same time very firmly fixed on the footboard of the automobile.

Figure 1:
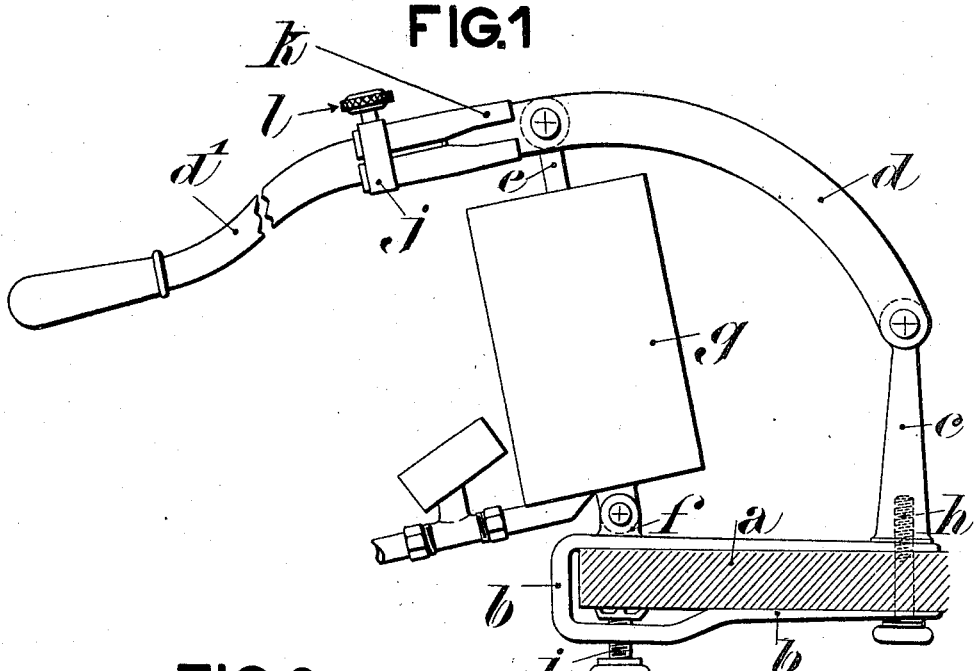
Figure 2:
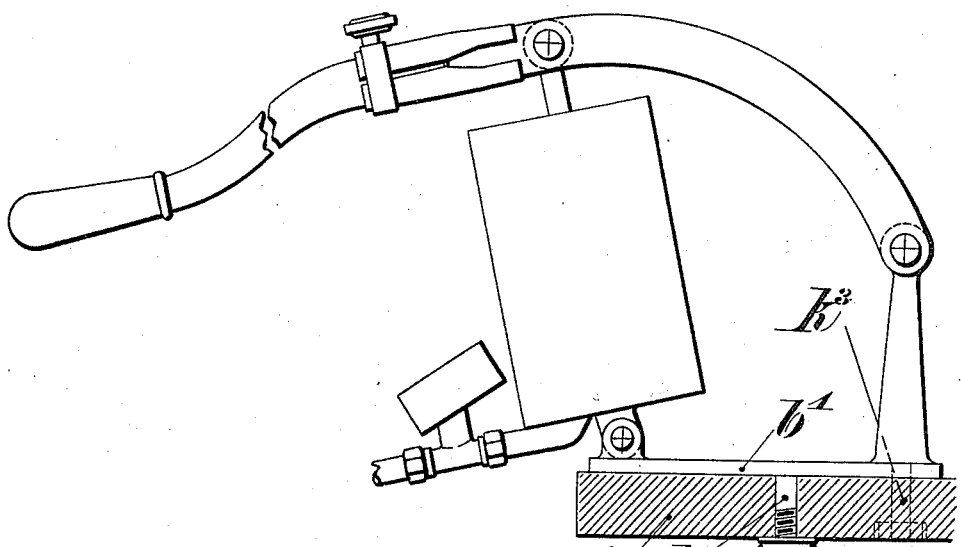

In the annexed drawing Figure 1 illustrates the pump as applied to the footboard of an automobile. Fig. 2 illustrates a modification thereof.

The pump in Fig. 1 is fixed on the footboard $a$ by a U shaped metal plate $b$ the respective arms of which lie against the upper and lower face of the footboard. This plate is sufficiently thin to be elastic and its upper part has at one end a vertical pillar $c$ on the top end of which is articulated the lever $d$ by which the plunger $e$ of the pump is actuated and at the other end a bearing $f$ on which the body of the pump $g$ oscillates. The fixation of the U shaped plate $b$ is obtained by a screw $h$ passed through the lower part of same, through the foot-board and into the piller $c$. A clamping screw $i$ is provided on the lower part of the plate and exerts pressure on the footboard $a$ to prevent any bending of the plate during actuation of the pump especially when the actuating lever is being raised.

In order to reduce the space occupied by the pump lever when not in use, the said lever is made in two parts $d$ $d^1$ the outer one $d^1$ of which is dismountable and when required for use is fixed to the first part by means of a split sleeve $k$ having a ring $j$ thereon provided with a pressure screw $l$ or by any other suitable means.

In the modification shown in Fig. 2 the U shaped plate is replaced by a flat base plate $b^1$ carrying the pillar and pump body bearing and about midway between these parts, a downwardly projecting bolt $k^2$ to be passed through a hole in the foot-board and secured by a wing nut $k^1$. A stud $k^3$ alined with the pillar passes through the end of the plate $b^1$ to steady the same and is secured by a nut.

What I claim as my invention and desire to secure by Letters Patent of the United States is:—

1. A tire pump for automobiles comprising a base plate adapted to be detachably attached to the running board of the vehicle; said base plate having a vertically disposed pillar on one end thereof and a substantially vertically disposed pump body pivotally mounted on said base plate adjacent but spaced from the pillar; a lever pivoted on said pillar and extending over and beyond the upper end of the pump body when the latter is in normal position; a pump pitman pivotally connected with said lever above the upper end of the pump body opposite the pivot, a screw connected with the plate adjacent the pillar to fasten the base plate on the support or running board, and means to prevent turning of the base plate when the pump lever is operated.

2. A tire pump for automobiles comprising a base plate adapted to be detachably attached to the running board of the vehicle; said base plate being bent to embrace the running board and having a vertically disposed pillar on one end thereof and a substantially vertically disposed pump body pivotally mounted on said base plate adjacent but spaced from the pillar; a lever pivoted on said pillar and extending over and beyond the upper end of the pump body when the latter is in normal position; a pump pitman pivotally connected with said lever above the upper end of the pump body opposite the pivot, a screw connected with the plate adjacent the pillar to fasten the base plate on the support or running board, a screw tapped through the lower part of the base adjacent its bend and engaging the running board; and means to prevent turning of the base plate when the pump lever is operated.

In witness whereof I have signed this specification in the presence of two witnesses.

JOSEPH MARIE ETIENNE FRANC.

Witnesses:
JEAN GERMAIN,
L. ESCHER.

Copies of this patent may be obtained for five cents each, by addressing the "Commissioner of Patents, Washington, D. C."